United States Patent
Yasuda

(10) Patent No.: US 8,643,763 B2
(45) Date of Patent: Feb. 4, 2014

(54) IMAGE PICKUP APPARATUS ARRANGED TO DETACHABLY MOUNT A LENS UNIT AND LENS UNIT

(75) Inventor: Hitoshi Yasuda, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/296,844

(22) Filed: Nov. 15, 2011

(65) Prior Publication Data

US 2012/0147255 A1 Jun. 14, 2012

(30) Foreign Application Priority Data

Dec. 10, 2010 (JP) .................................. 2010-276163
Oct. 25, 2011 (JP) .................................. 2011-234204

(51) Int. Cl.
- H04N 5/225 (2006.01)
- G02B 13/16 (2006.01)
- H04N 5/235 (2006.01)
- H04N 5/228 (2006.01)
- H04N 9/73 (2006.01)
- G02B 23/00 (2006.01)
- G02B 15/14 (2006.01)

(52) U.S. Cl.
USPC ................... 348/335; 348/222.1; 348/221.1; 348/228.1; 359/425; 359/694; 359/697

(58) Field of Classification Search
USPC ............... 348/335–368, 220.1, 221.1, 222.1, 348/240.1, 240.2, 240.3, 234–238; 359/425–461, 694–706
See application file for complete search history.

(56) References Cited

U.S. PATENT DOCUMENTS

| | | | | |
|---|---|---|---|---|
| 5,150,146 A | * | 9/1992 | Ueda et al. | 396/104 |
| 5,828,446 A | * | 10/1998 | Davis | 356/124 |
| 6,224,271 B1 | * | 5/2001 | Park | 396/448 |
| 6,900,946 B2 | * | 5/2005 | Koehler | 359/679 |
| 7,693,408 B1 | * | 4/2010 | Tsai | 396/79 |
| 7,864,242 B2 | * | 1/2011 | Namai et al. | 348/367 |
| 7,932,950 B2 | * | 4/2011 | Yamazaki | 348/345 |

(Continued)

FOREIGN PATENT DOCUMENTS

| EP | 1895768 A | 3/2008 |
|---|---|---|
| EP | 2037321 A | 3/2009 |

OTHER PUBLICATIONS

The above references were cited in a Apr. 12, 2012 European Search Report a copy of which is enclosed of the counterpart European Patent Application No. 11191870.2.

*Primary Examiner* — Chia-Wei A Chen

(74) *Attorney, Agent, or Firm* — Cowan, Liebowitz & Latman, P.C.

(57) ABSTRACT

An image pickup apparatus arranged to detachably mount a lens unit including a focus lens, controls such that if the focus lens is movable by the amount of movement within a predetermined time, a next amount of movement of the focus lens is decided on the basis of a first focus signal extracted from an image signal corresponding to charges accumulated in a focus detection area at a first timing, and if the focus lens is not movable by the amount of movement amount within the predetermined time, a next amount of movement of the focus lens is decided after completion of the movement of the focus lens on the basis of a second focus signal extracted from the image signal corresponding to the charges accumulated in the focus detection area at a second timing at which the focus lens is stopped.

16 Claims, 13 Drawing Sheets

(56) References Cited

U.S. PATENT DOCUMENTS

| | | | |
|---|---|---|---|
| 7,973,852 B2* | 7/2011 | Ito et al. | 348/349 |
| 2004/0109081 A1* | 6/2004 | Sumi | 348/345 |
| 2005/0146636 A1* | 7/2005 | Fujii | 348/360 |
| 2005/0185083 A1 | 8/2005 | Okawara | |
| 2006/0204122 A1* | 9/2006 | Onozawa | 382/255 |
| 2008/0002033 A1* | 1/2008 | Ito et al. | 348/211.99 |
| 2008/0002048 A1* | 1/2008 | Ito et al. | 348/345 |
| 2008/0002960 A1* | 1/2008 | Ito et al. | 396/125 |
| 2008/0018777 A1* | 1/2008 | Higashino | 348/353 |
| 2008/0055751 A1* | 3/2008 | Morimoto | 359/823 |
| 2009/0067828 A1* | 3/2009 | Ono et al. | 396/128 |
| 2009/0244325 A1* | 10/2009 | Honjo et al. | 348/231.99 |
| 2009/0251799 A1* | 10/2009 | Sasaki | 359/694 |
| 2009/0322932 A1* | 12/2009 | Ishiwata | 348/345 |
| 2010/0053418 A1* | 3/2010 | Irie | 348/345 |
| 2010/0182491 A1* | 7/2010 | Yoshitsugu et al. | 348/345 |
| 2011/0063497 A1* | 3/2011 | Kawazoe et al. | 348/373 |

\* cited by examiner

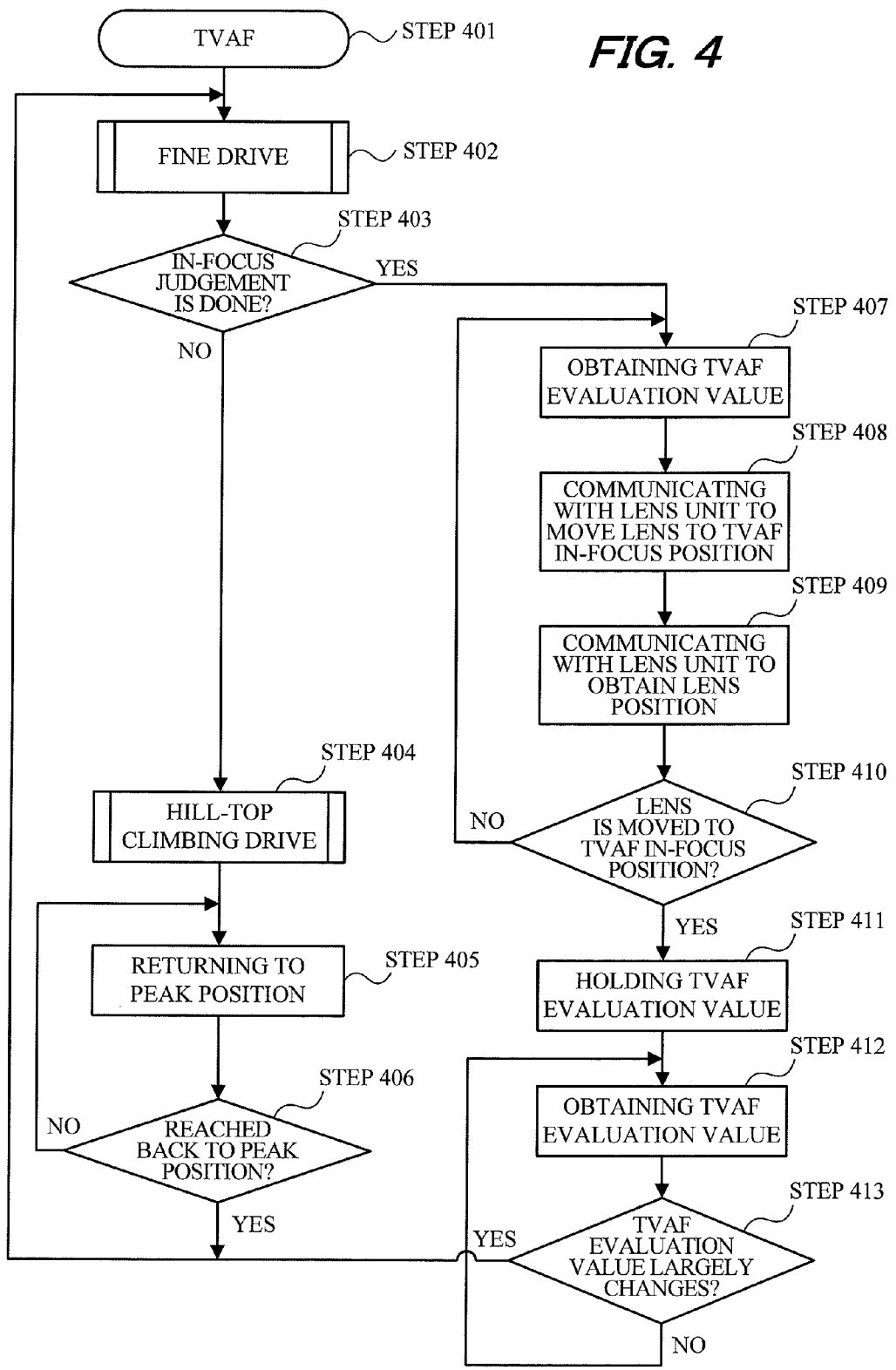

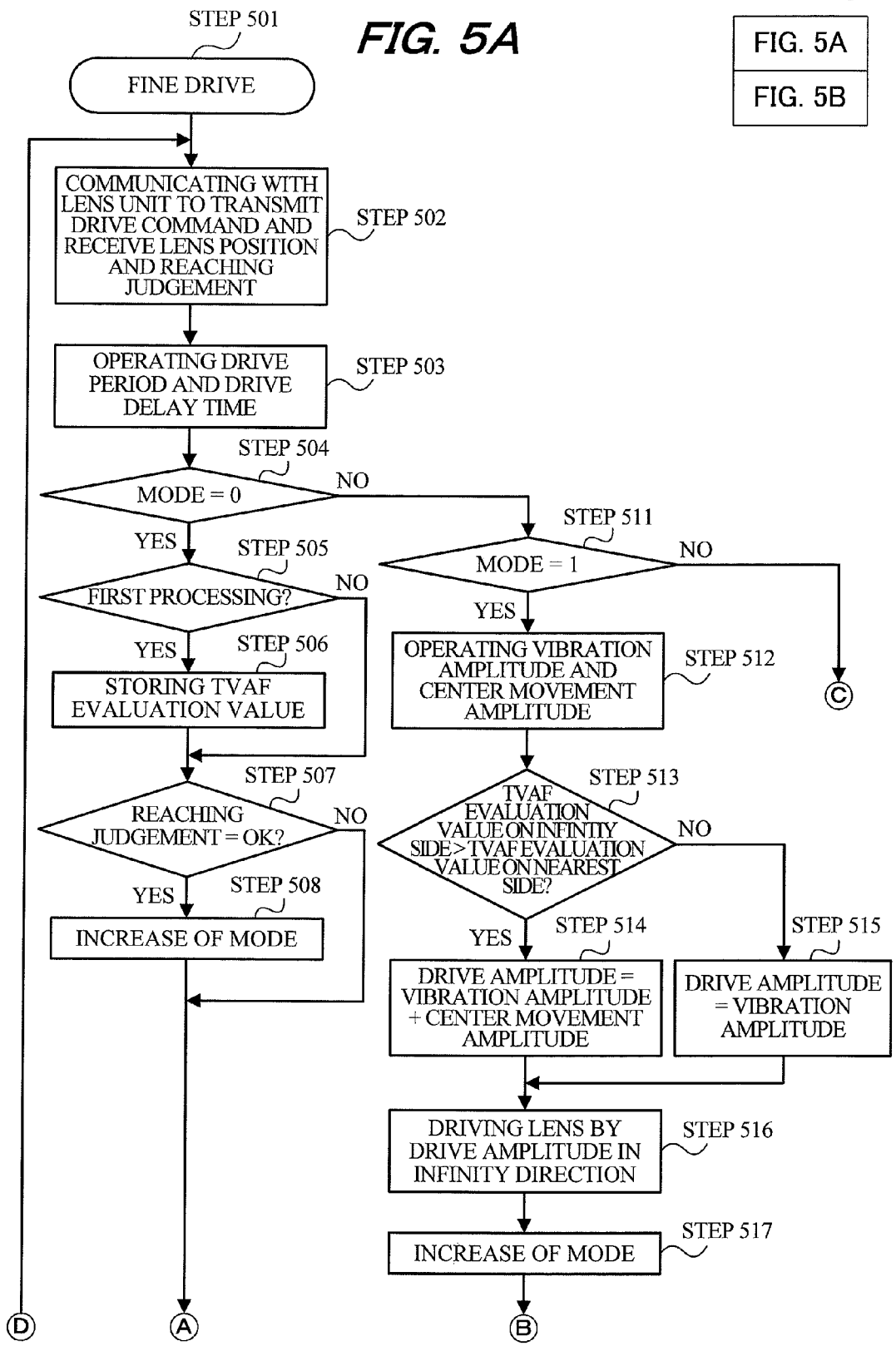

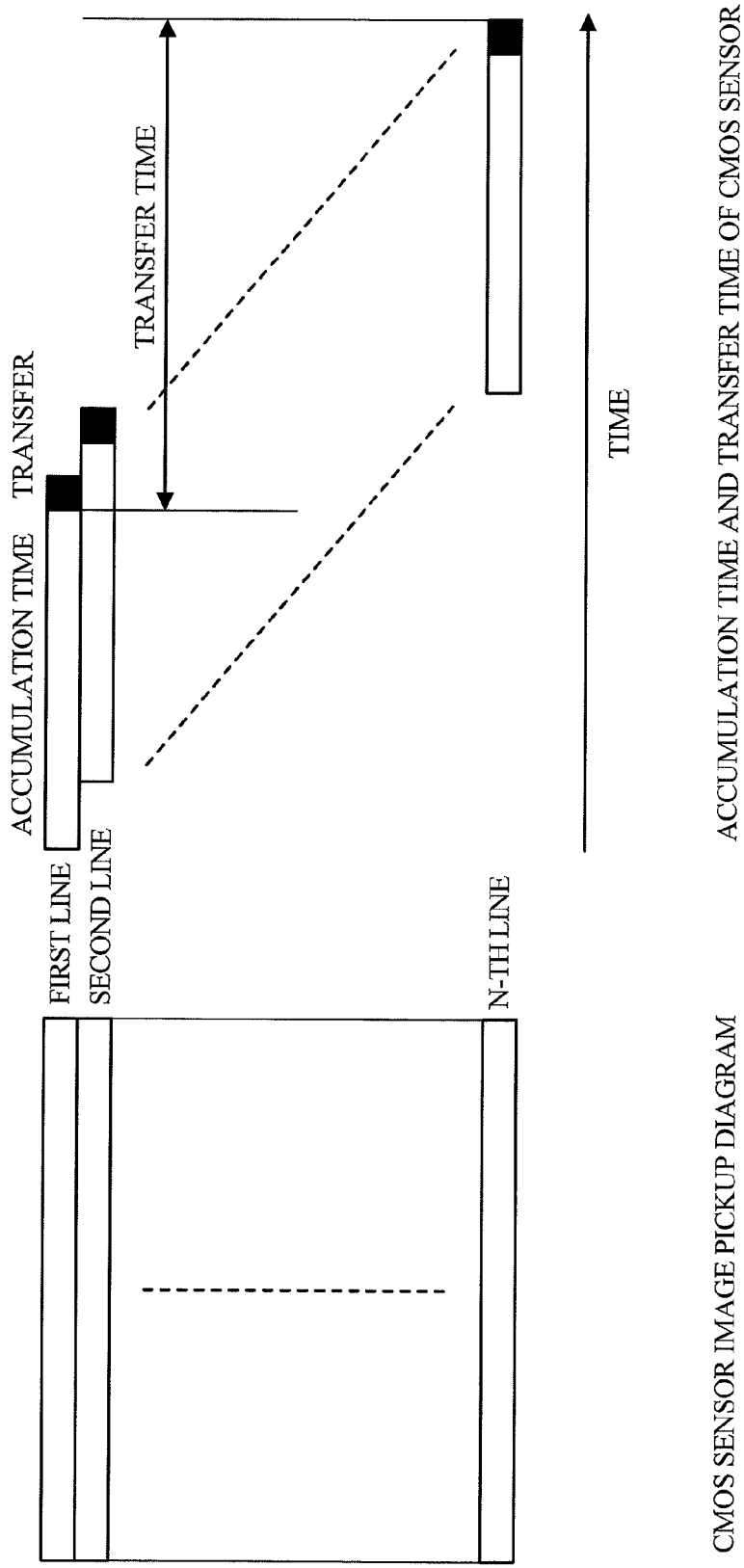

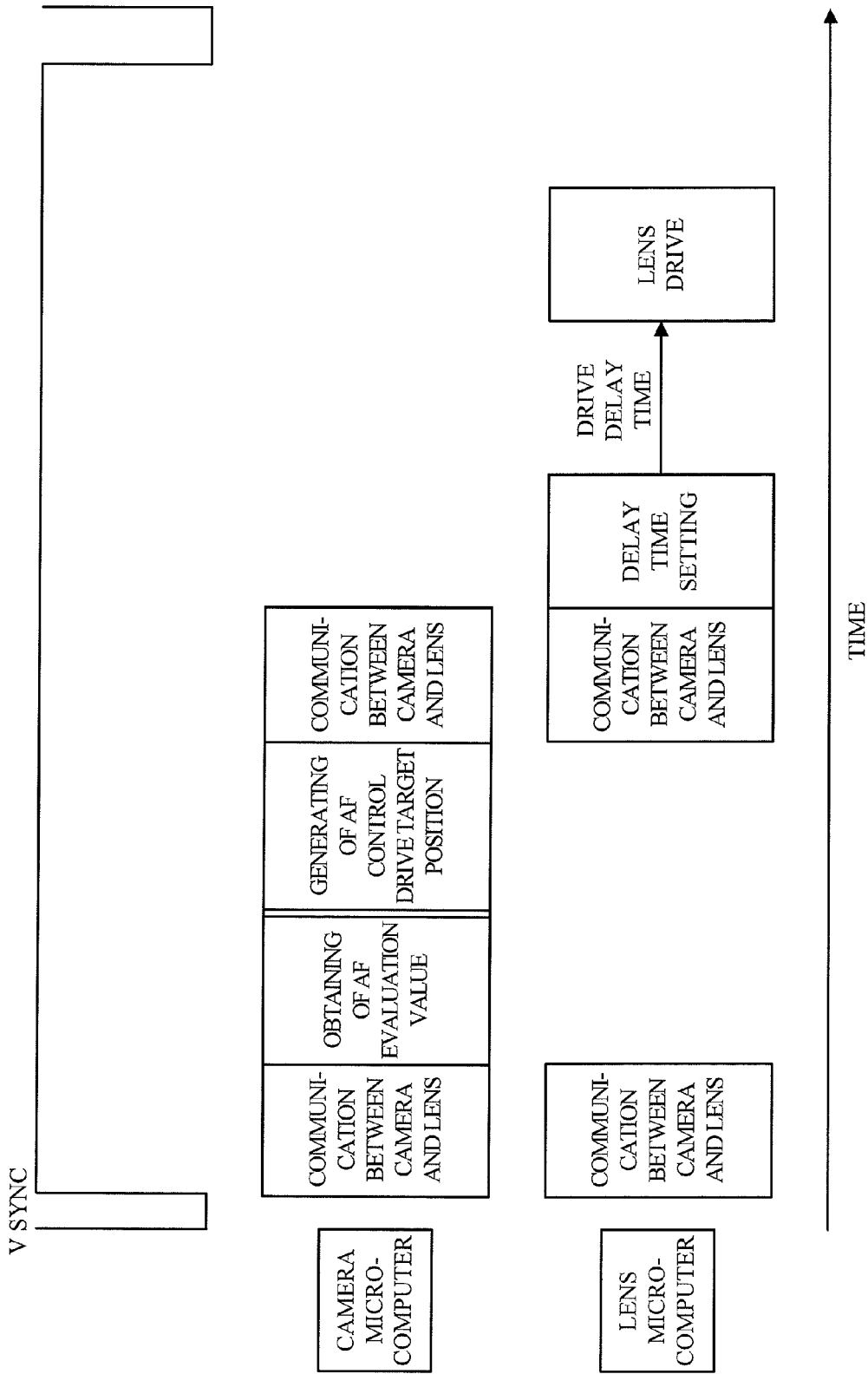

FIG. 9

| CAMERA → LENS COMMUNICATION ||
|---|---|
| WORD 1 | FOCUS TARGET POSITION |
| WORD 2 | FOCUS SPEED |

| LENS → CAMERA COMMUNICATION ||
|---|---|
| WORD 1 | FOCUS LENS POSITION |
| WORD 1 | TARGET POSITION REACHING JUDGEMENT |

CAMERA MICROCOMPUTER CHANGES BASED ON COMMUNICATION DATA

CHANGE SUBSEQUENT FOCUS DRIVE IN ACCORDANCE WITH TARGET POSITION REACHING JUDGEMENT, AND CHANGE TVAF EVALUATION VALUE TO BE REFERRED TO

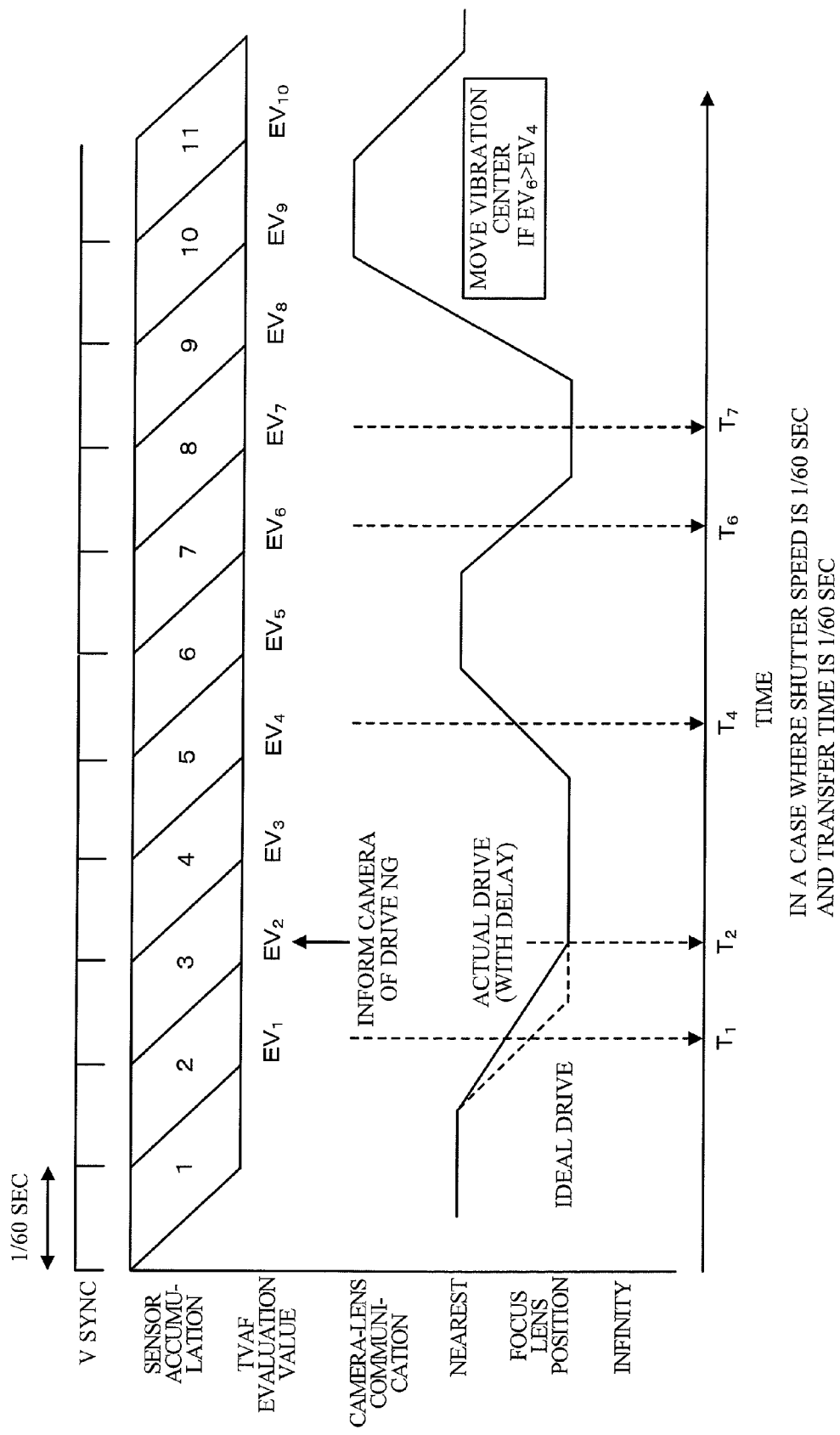

IMAGE PICKUP APPARATUS ARRANGED TO DETACHABLY MOUNT A LENS UNIT AND LENS UNIT

BACKGROUND OF THE INVENTION

1. Field of the Invention

The present invention relates to an image pickup apparatus arranged to detachably mount a lens unit and to a lens unit which is detachable to the image pickup apparatus.

2. Description of the Related Art

In recent years, as an auto-focus system of an image pickup apparatus, a system in which a value of sharpness of a picture detected from an image signal obtained by photoelectrically converting an object image by an image pickup element or the like is set to an AF evaluation value and a focus lens position is controlled so as to maximize the AF evaluation value (hereinbelow, such a system is referred to as a TVAF system) is a main stream.

The AF evaluation value of the TVAF system is generally formed by using a level of a high frequency component of the image signal extracted by a band-pass filter of some bands. FIG. 2 illustrates an example of a relation between the focus lens position and the AF evaluation value in the TVAF system. In the case where an ordinary object image is photographed, the AF evaluation value increases as an in-focus state approaches and a point at which its level becomes maximum is set to an in-focus position as illustrated in FIG. 2.

The Official Gazette of Japanese Patent Application Laid-Open No. H09-9130 discloses such a technique that in a video camera arranged to detachably mount a lens unit, in a camera main body, a main body (camera) microcomputer transmits a focus signal extracted from an image signal to the lens unit and a lens microcomputer in the lens unit makes AF control. The lens microcomputer controls the drive of a focus lens on the basis of the received focus signal.

On the other hand, such a system in which a microcomputer in a camera decides drive control of a focus lens on the basis of an extracted focus signal and transmits a drive command of the focus lens to a lens microcomputer is also presumed. In the case of executing the wobbling operation by using a vertical synchronization signal synchronized with exposure of an image pickup element, it is necessary to stop the focus lens during the charge accumulation to generate the focus signal. Therefore, timing at which the focus lens is movable is restricted within a time during which the charge accumulation to form the focus signal is not performed. Consequently, the lens microcomputer has to complete the movement of the focus lens during such timing in accordance with an instruction from the camera microcomputer. However, if the focus lens cannot reach a target position instructed from the camera microcomputer within the time, there is a fear that the camera microcomputer cannot make focus adjustment control by using the proper AF evaluation value.

SUMMARY OF THE INVENTION

It is an aspect of the present invention that when the wobbling operation is executed, even in the case where a movement of a focus lens cannot be completed even within a predetermined time, proper AF control is enabled. According to an aspect of the present invention, an image pickup apparatus, which is arranged to detachably mount a lens unit having an optical system including a focus lens, comprises an image pickup unit configured to accumulate charges by detecting light which passed through the optical system of the attached lens unit, and generate an image signal from the charges, an extraction unit configured to extract a focus signal from the image signal corresponding to a focus detection area in an image pickup plane of the image pickup unit, and a control unit configured to decide on an amount of movement of the focus lens on the basis of the focus signal extracted by the extraction unit, transmit information of the amount of movement to the lens unit, and receive information from the lens unit, wherein if the control unit determines on the basis of the information received from the lens unit that the focus lens is movable by the amount of movement within a predetermined time, the control unit decides a next amount of movement of the focus lens on the basis of a first focus signal extracted from the image signal corresponding to the charges accumulated in the focus detection area at a first timing, and if the control unit determines that the focus lens is not movable by the amount of movement within the predetermined time, the control unit decides a next amount of movement of the focus lens without using the first focus signal after completion of the movement of the focus lens on the basis of a second focus signal extracted from the image signal corresponding to the charges accumulated in the focus detection area at a second timing at which the focus lens is stopped.

Further features of the present invention will become apparent from the following description of exemplary embodiments with reference to the attached drawings.

BRIEF DESCRIPTION OF THE DRAWINGS

FIG. 4 is a flowchart of a TVAF in an embodiment of the invention.

FIG. 7 is a diagram for describing accumulation timing of a CMOS sensor.

FIG. 8 is a diagram illustrating timing chart for processings of a camera microcomputer and a lens microcomputer in the embodiment of the invention.

FIG. 9 is a diagram illustrating communication data of the camera microcomputer and the lens microcomputer in the embodiment of the invention.

FIG. 10 is a diagram for describing a fine drive at a time when a time lag of a focus lens drive occurs in the embodiment of the invention.

DESCRIPTION OF THE EMBODIMENTS

Exemplary of embodiments of the present invention will be described hereinbelow with reference to the drawings.

First Embodiment

Figure 1:
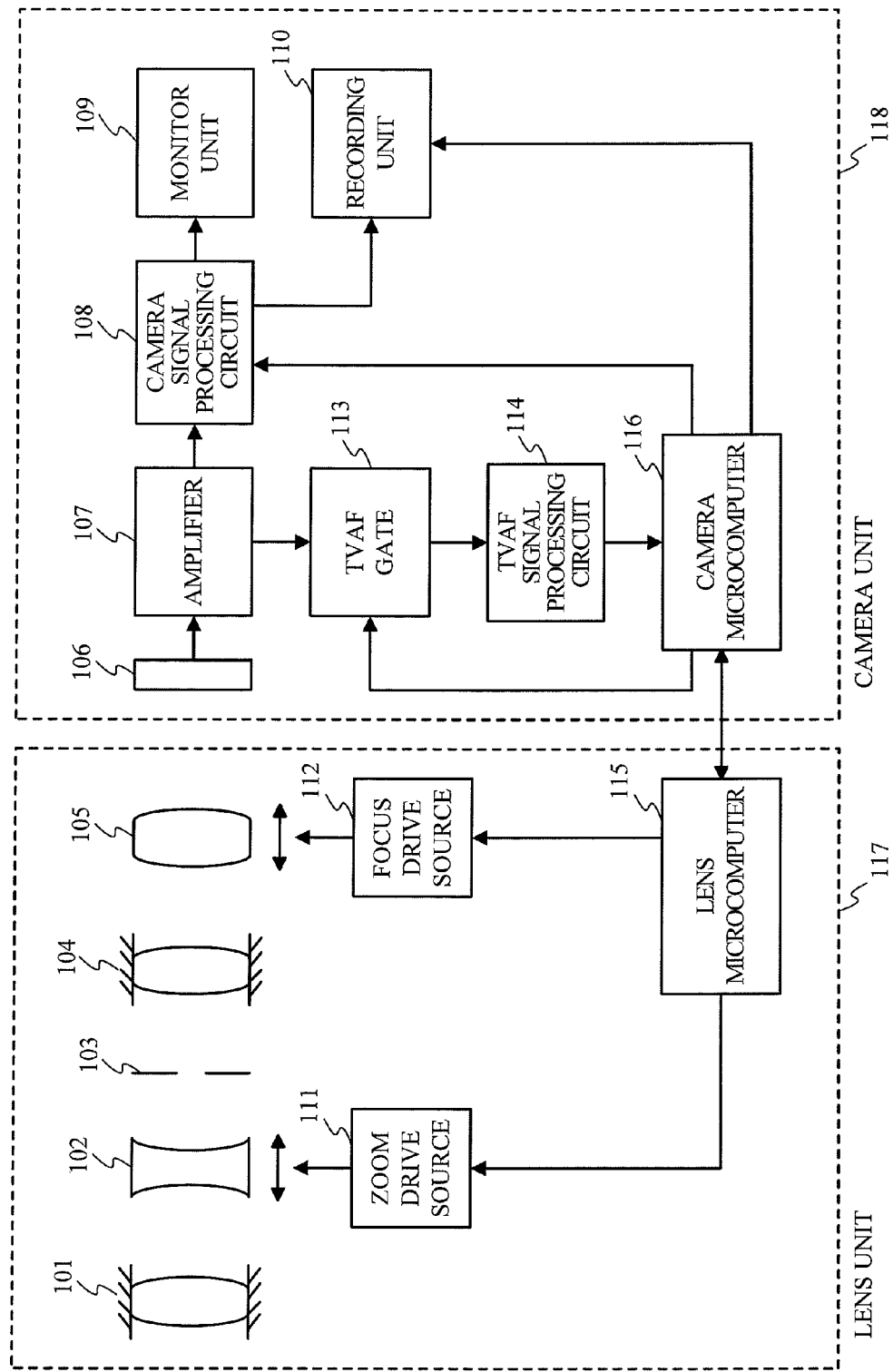
FIG. 1 is a block diagram illustrating a construction of a camera and lenses.

FIG. 1 is a block diagram illustrating a construction of a camera using an interchangeable lens system. In the diagram, a lens unit 117 is detachable to a camera unit 118.

Light from an object passes through an optical system constructed by a fixed first lens group 101 in the lens unit 117, a second lens group 102 for magnification, an iris 103, a fixed third lens group 104, and a fourth lens group 105 (hereinbelow, referred to as a focus lens) having both of a focus adjustment function and a compensation function for correcting a movement of a focal plane by the magnification and then is formed as an image onto an image pickup element 106 serving as an image pickup unit in the camera unit. The image pickup element 106 in the camera unit is a photoelectric conversion element constructed by a CMOS sensor or the like. The image formed on the image pickup element 106 is photoelectrically converted, amplified to an optimum level by an amplifier 107, and thereafter, input to a camera signal processing circuit 108.

The camera signal processing circuit 108 executes various kinds of image processings to an output signal from the amplifier 107 and forms an image signal. A monitor unit 109 constructed by an LCD or the like displays the image signal from the camera signal processing circuit 108. A recording unit 110 records the image signal from the camera signal processing circuit 108 onto a recording medium such as a semiconductor memory or the like.

Figure 2:
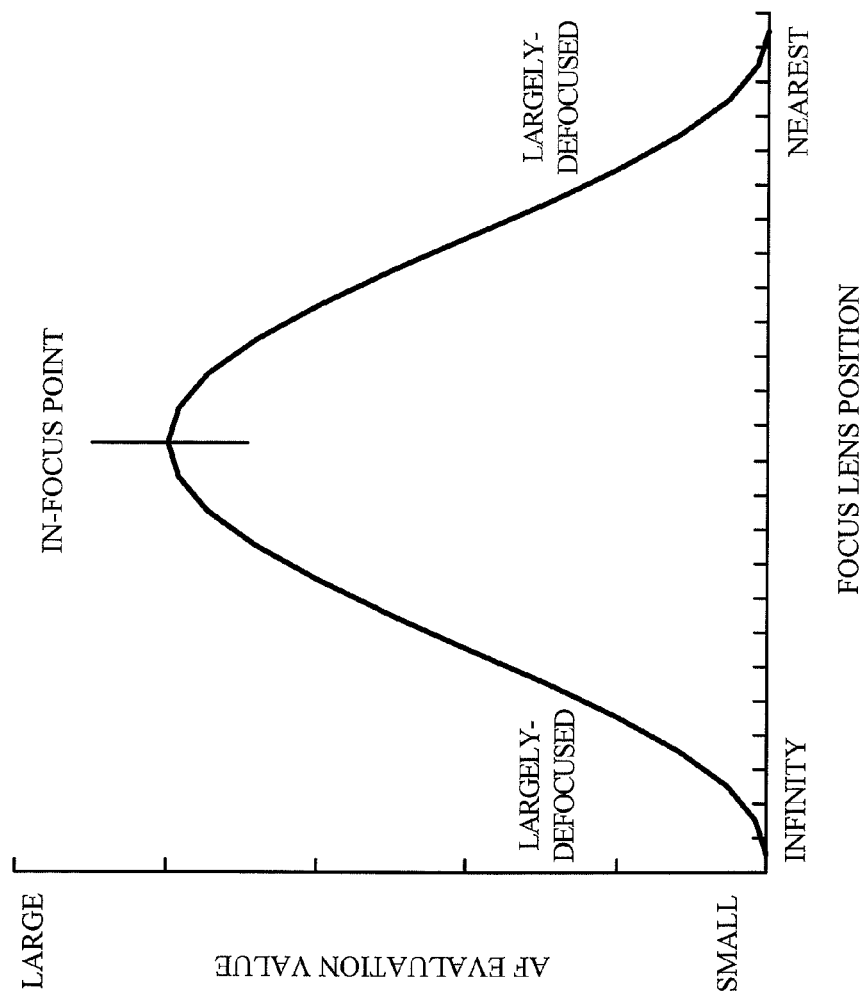
FIG. 2 is a diagram for describing a TVAF evaluation value signal.

A TVAF gate 113 allows only a signal in a pixel area used for focus detection among output signals of all pixels from the amplifier 107 to pass. A TVAF signal processing circuit 114 serving as an extraction unit extracts high frequency components from the signal which passes through the TVAF gate 113 and forms a TVAF evaluation value signal. The TVAF evaluation value signal is output to a camera microcomputer 116. The TVAF evaluation value signal indicates a sharpness (contrast state) of an image which is formed on the basis of an output signal from the image pickup element 106. Since the contrast state changes depending on a focus state of the optical system, the TVAF evaluation value signal eventually becomes a signal showing the focus state of the optical system as illustrated in FIG. 2.

Figure 3:
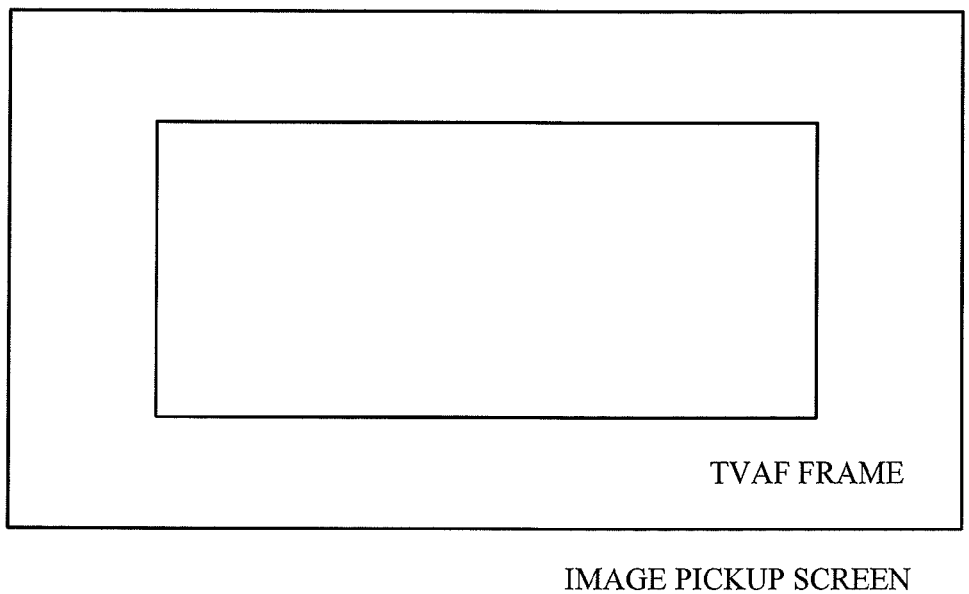
FIG. 3 is a diagram for describing a TVAF frame.

FIG. 3 illustrates a TVAF frame in an image pickup screen. The camera microcomputer 116 serving as a control unit controls the operation of a whole video camera and controls the TVAF gate 113 so as to set the TVAF frame at a predetermined ratio to the image pickup screen. The camera microcomputer 116 decides a drive command of the focus lens 105 on the basis of the TVAF evaluation value signal obtained from the TVAF signal processing circuit 114 and transmits to a lens microcomputer 115 serving as a lens side control unit.

A zoom drive source 111 is a drive source for moving the magnification lens 102. A focus drive source 112 (drive unit) is a drive source for moving the focus lens 105. Each of the zoom drive source 111 and the focus drive source 112 is constructed by actuators such as stepper motor, DC motor, vibration motor, voice coil motor, and the like. The lens microcomputer 115 controls the drive of the focus drive source 112 on the basis of a drive command received from the camera microcomputer 116 and moves the focus lens 105 in an optical axis direction, thereby obtaining the in-focus state.

Subsequently, the TVAF control which is made in the camera microcomputer 116 will be described with reference to FIG. 4 and subsequent drawings. The TVAF control is executed in accordance with a computer program stored in the camera microcomputer 116. The actual drive of the focus lens 105 is performed by the lens microcomputer 115.

Step 401 shows a start of a processing routine. In Step 402, the camera microcomputer 116 instructs the lens microcomputer 115 so as to execute the fine driving operation. On the basis of a result of the fine driving operation, the camera microcomputer 116 determines whether or not an in-focus state has been obtained or, if the in-focus state is not obtained, whether or not there is an in-focus point. The fine operation will be described hereinafter with reference to FIGS. 5A and 5B. In Step 403, the camera microcomputer 116 determines whether or not the focus is judged in Step 402. If the focus is judged, Step 407 follows and the camera microcomputer 116 executes an in-focus stop/reactivation judgement processing. If the focus is not still judged, Step 404 follows.

In Step 404, the camera microcomputer 116 instructs the lens microcomputer 115 so as to move the focus lens 105 by the hill-top climbing drive at a predetermined speed in the direction determined in Step 402 and searches for a focus lens position where the TVAF evaluation value reaches a peak during the hill-top climbing drive. The fine operation will be described hereinafter with reference to FIG. 11. In Step 405, the camera microcomputer 116 instructs the lens microcomputer 115 so as to move the focus lens 105 back to the focus lens position where the TVAF evaluation value reaches the peak during the hill-top climbing drive. In Step 406, the camera microcomputer 116 determines whether or not the focus lens 105 has been moved back to the focus lens position where the TVAF evaluation value reaches the peak. If the camera microcomputer 116 determines that the focus lens 105 has been moved back to the focus lens position where the TVAF evaluation value reaches the peak, the processing routine is returned to Step 402 and the camera microcomputer 116 again instructs the lens microcomputer 115 so as to execute the fine driving operation. If the camera microcomputer 116 determines that the focus lens 105 does not move back to the focus lens position where the TVAF evaluation value reaches the peak, the processing routine is returned to Step 405 and the camera microcomputer 116 instructs the lens microcomputer 115 so as to continue the operation for moving the focus lens 105 back to the focus lens position where the TVAF evaluation value reaches the peak.

Subsequently, the in-focus stop/reactivation judgement processing from Step 407 will be described. In Step 407, the camera microcomputer 116 obtains the TVAF evaluation value from the TVAF signal processing circuit 114. In Step 408, the camera microcomputer 116 communicates a control command with the lens microcomputer 115 so as to move the focus lens to the judged in-focus position. In Step 409, the camera microcomputer 116 communicates with the lens microcomputer 115 and obtains the focus lens position. In Step 410, the camera microcomputer 116 determines whether or not the focus lens 105 has moved to the in-focus position. If the camera microcomputer 116 determines that the focus lens 105 has moved to the in-focus position, Step 411 follows. If the camera microcomputer 116 determines that the focus lens 105 does not move to the in-focus position, the processing routine is returned to Step 407. In Step 411, the camera microcomputer 116 holds the latest TVAF evaluation value. In Step 412, the camera microcomputer 116 obtains the latest TVAF evaluation value. In Step 413, the camera microcomputer 116 compares the TVAF evaluation value held in Step 411 with the latest TVAF evaluation value obtained in Step 412, thereby judging whether or not the TVAF evaluation value has largely changed. If the camera microcomputer 116 judges that the TVAF evaluation value has largely changed, it is decided that the object was changed, and the processing routine advances to Step 402. The camera microcomputer 116 instructs the lens microcomputer 115 so as to restart the fine driving operation. If the camera microcomputer 116 determines that the TVAF evaluation value does not largely change, the processing routine is returned to Step 412.

Figure 5B:
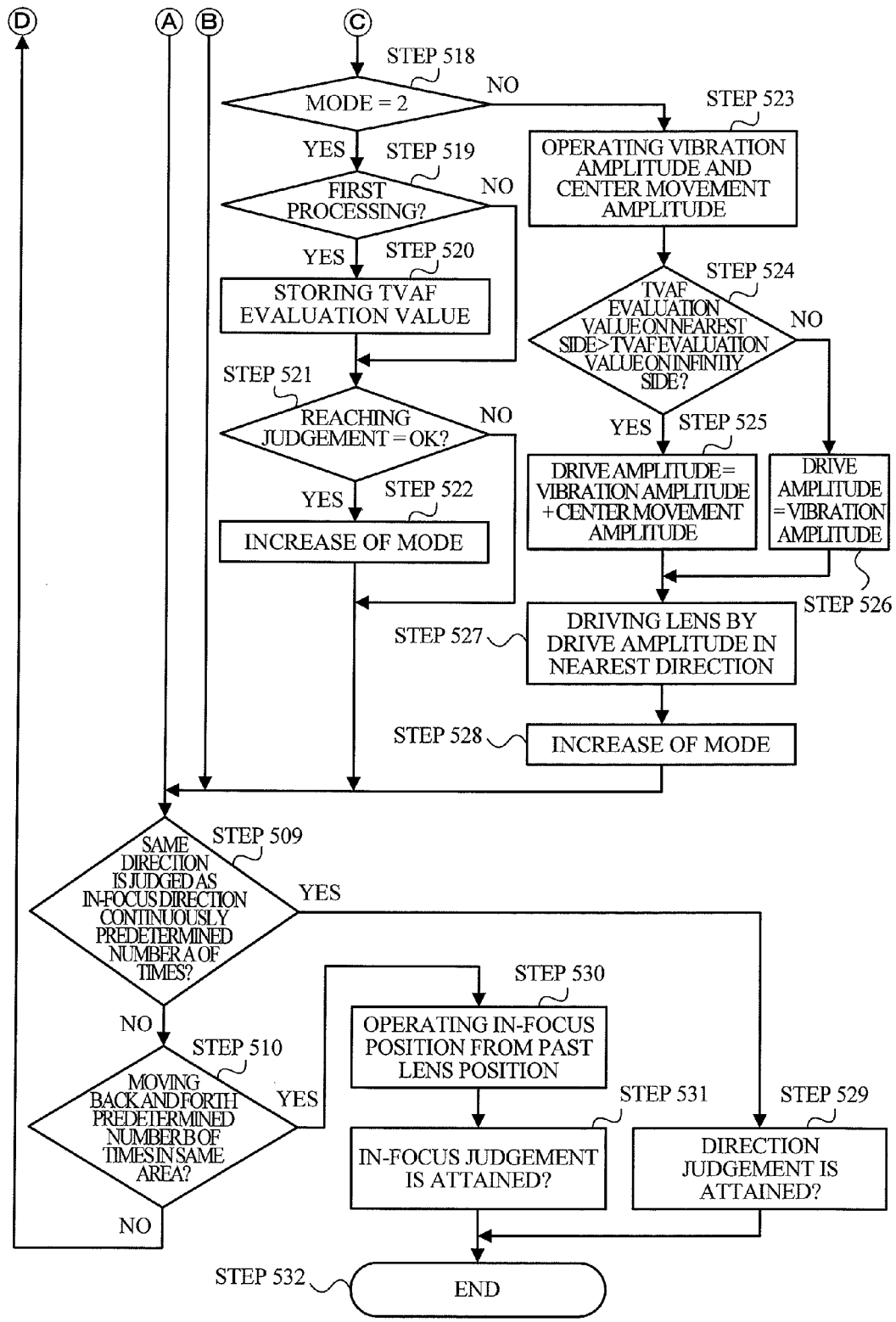
FIG. 5 is comprised of FIGS. 5A and 5B, are flowcharts illustrating control of a fine drive in the embodiment of the invention.

Subsequently, the fine driving operation in Step 402 will be described. FIGS. 5A and 5B are flowcharts for the fine drive control. Step 501 shows a start of a processing routine. In Step 502, the camera microcomputer 116 communicates with the lens microcomputer 115. The camera microcomputer 116 transmits a focus lens drive command (a target position and a drive speed of the focus lens 105) to the lens microcomputer 115. The camera microcomputer 116 receives data of the focus lens position and data of the target position reaching judgement from the lens microcomputer 115.

In Step 503, the camera microcomputer 116 obtains a drive period for driving the focus lens 105 and a drive delay time from the communication until the drive of the focus lens 105 is started. The drive delay time is a time adapted to adjust an accumulation time and a phase of the focus lens drive so as to stop the focus lens 105 during the charge accumulation of the image pickup element 106 in an area corresponding to a TVAF frame. In the embodiment, the drive period is set to 2V, and such an operation that the focus lens 105 is driven for a period of time of 1V and is stopped for 1V is repeated. The drive period is not limited to such a value.

In Step 504, the camera microcomputer 116 determines whether or not a current Mode is equal to 0. If it is equal to 0, Step 505 follows and the camera microcomputer 116 executes a processing at the focus lens position on a nearest side, which will be described hereinafter. If the Mode is not equal to 0, Step 511 follows.

Processing at the Focus Lens Position on the Nearest Side

In Step 505, the camera microcomputer 116 judges whether or not the processing at the focus lens position on the nearest side is the first processing (in the previous processing, a result of the following reaching judgement is not NG). If NO in Step 505, the processing routine advances to Step 507. If YES, in Step 506, the camera microcomputer 116 stores the TVAF evaluation value as a TVAF evaluation value on an infinity side (since it is based on a sensor output accumulated when the focus lens is located on the infinity side).

In Step 507, the camera microcomputer 116 judges whether or not the result of the target position reaching judgement received from the lens microcomputer 115 is OK. If it is not OK, Step 509 follows. If it is OK, the camera microcomputer 116 increases the Mode (if the Mode is equal to 4 or more, it is returned to 0) in Step 508 and the processing routine advances to Step 509.

Common Processings

In Step 509, the camera microcomputer 116 advances to Step 529 if a same direction is continuously determined as an in-focus direction for a predetermined number "A" of times. If NO, Step 510 follows. In Step 510, if the focus lens 105 has repeatedly moved back and forth for a predetermined number "B" of times in the same area, Step 530 follows. If the focus lens 105 does not repeatedly move back and forth for the predetermined number "B" of times in the same area, the processing routine is returned to Step 502.

It is assumed that the camera microcomputer 116 could attain the direction judgment in Step 529, Step 532 follows, and the processing routine is finished and advances to the hill-top climbing drive.

In Step 530, the camera microcomputer 116 arithmetically operates an average position of the focus lens positions obtained for a period of time during which the focus lens 105 is repeatedly moved back and forth for the predetermined number "B" of times in the same area as an in-focus position. If the camera microcomputer 116 attains the in-focus judgement in Step 531, then Step 532 follows and the processing routine is finished and advances to the in-focus stop/reactivation judgement processing.

In Step 511, the camera microcomputer 116 determines whether or not the current Mode is equal to 1. If it is equal to 1, Step 512 follows and a processing for driving the focus lens 105 to the infinity side, which will be described hereinafter, is executed. If it is not equal to 1, Step 518 follows.

Processing for Infinitely Driving the Focus Lens

In Step 512, the camera microcomputer 116 arithmetically operates a vibration amplitude and a center movement amplitude. Although not described in detail here, generally, a depth of focus is used as a reference, so that when the depth is small, the amplitude is decreased, while when the depth is large, the amplitude is increased.

In Step 513, the camera microcomputer 116 compares the TVAF evaluation value on the infinity side in Mode=0 mentioned above with a TVAF evaluation value on the nearest side in Mode=2, which will be described hereinafter. If the infinity side TVAF evaluation value is larger than the nearest side TVAF evaluation value, Step 514 follows. If the infinity side TVAF evaluation value is equal to or less than the nearest side TVAF evaluation value, Step 515 follows.

In Step 514, the camera microcomputer 116 sets the drive amplitude of the focus lens 105 as (the drive amplitude=the vibration amplitude+the center movement amplitude). In Step 515, the camera microcomputer 116 sets the drive amplitude of the focus lens 105 as (the drive amplitude=the vibration amplitude). In Step 516, the camera microcomputer 116 instructs the lens microcomputer 115 so as to drive the focus lens 105 in the infinity direction at the amplitude decided in Step 514 or Step 515.

In Step 517, the camera microcomputer 116 increases the Mode (if the Mode is equal to 4 or more, it is returned to 0) and advances to Step 509. Processings in Step 509 and subsequent Steps are executed in a manner similar to that mentioned above.

In Step 518, the camera microcomputer 116 determines that the current Mode is equal to 2. If it is equal to 2, Step 519 follows. The camera microcomputer 116 executes a processing at an infinite focus lens position, which will be described hereinafter. If it is not equal to 2, Step 523 follows.

Processing at the Focus Lens Position on the Infinity Side

In Step 519, the camera microcomputer 116 judges whether or not the processing at the infinity side focus lens position is the first processing (in the previous processing, a result of the following reaching judgement is not NG). If NO in Step 519, the processing routine advances to Step 521. If YES, in Step 520, the camera microcomputer 116 stores the TVAF evaluation value as a TVAF evaluation value on the nearest side (since it is based on the sensor output accumulated when the focus lens is located on the nearest side).

In Step 521, the camera microcomputer 116 judges whether or not the result of the target position reaching judgement received from the lens microcomputer 115 is OK. If it is not OK, Step 509 follows. If it is OK, the camera microcomputer 116 increases the Mode (if the Mode is equal to 4 or more, it is returned to 0) in Step 522 and the processing routine advances to Step 509. Processings in Step 509 and subsequent Steps are executed in a manner similar to that mentioned above.

Processing for Driving the Focus Lens to the Nearest Position

In Step 523, the camera microcomputer 116 arithmetically operates the vibration amplitude and the center movement amplitude of the focus lens 105. Although not described in detail here, generally, the depth of focus is used as a reference, so that when the depth is small, the amplitude is decreased, while when the depth is large, the amplitude is increased.

In Step 524, the camera microcomputer 116 compares the TVAF evaluation value on the infinity side in Mode=0 mentioned above with the TVAF evaluation value on the nearest side in Mode=2 mentioned above. If the nearest side TVAF evaluation value is larger than the infinity side TVAF evaluation value, Step 525 follows. If the nearest side TVAF evaluation value is equal to or less than the infinity side TVAF evaluation value, Step 526 follows.

In Step 525, the camera microcomputer 116 sets the drive amplitude of the focus lens 105 as (the drive amplitude=the vibration amplitude+the center movement amplitude). In Step 526, the camera microcomputer 116 sets the drive amplitude of the focus lens 105 as (the drive amplitude=the vibration amplitude).

In Step 527, the camera microcomputer 116 instructs the lens microcomputer 115 so as to drive the focus lens 105 in the infinity direction at the amplitude decided in Step 525 or Step 526.

In Step 528, the camera microcomputer 116 increases the Mode (if the Mode is equal to 4 or more, it is returned to 0) and advances to Step 509. Processings in Step 509 and subsequent Steps are executed in a manner similar to that mentioned above.

Figure 6:
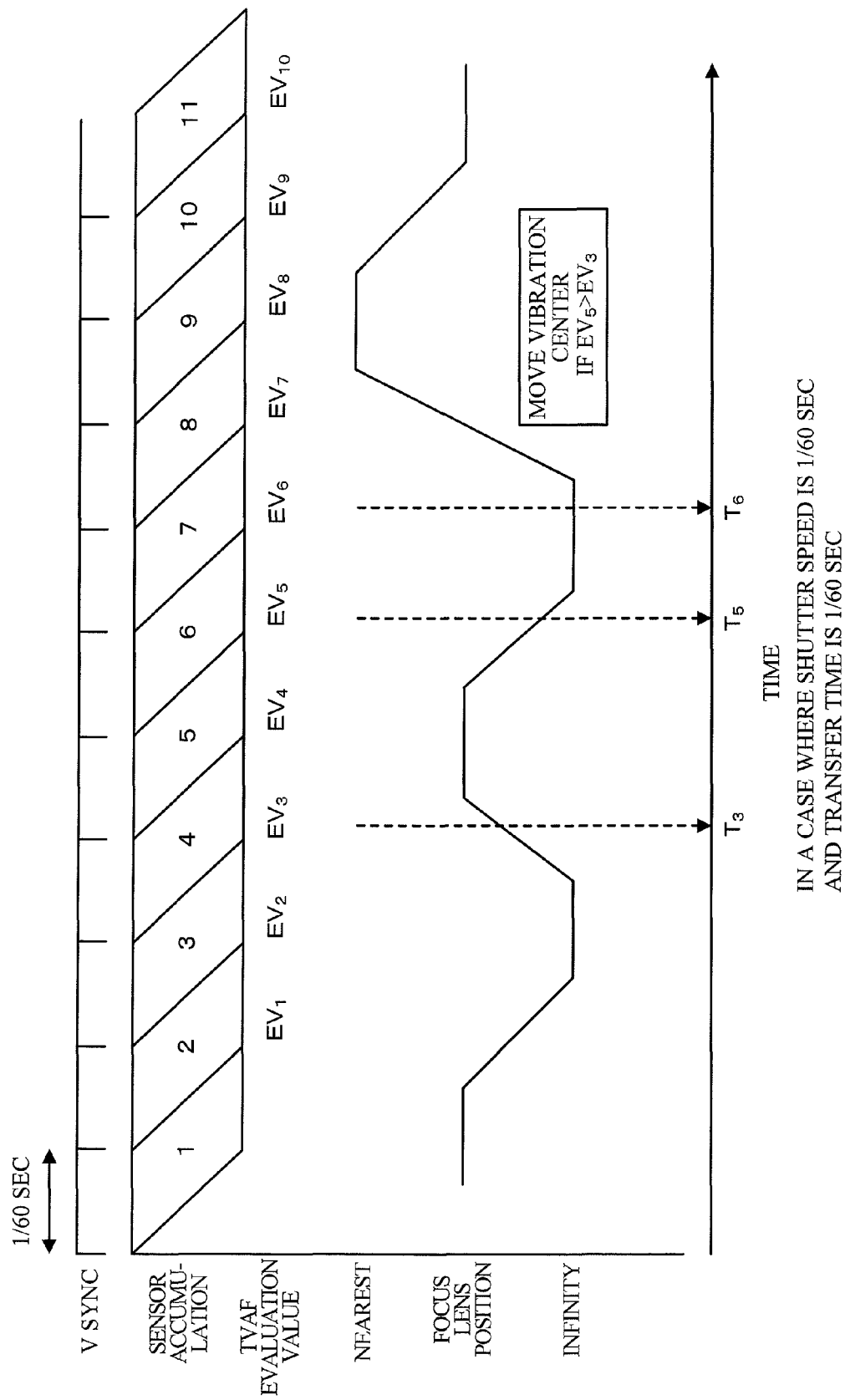
FIG. 6 is a diagram for describing the fine drive in the embodiment of the invention.

FIG. 6 illustrates a temporal progress of the focus lens operation mentioned above. In the diagram, an axis of abscissa indicates a time and a downwardly convex period in the top portion shows a vertical synchronization signal (hereinbelow, referred to as a V sync signal) of an image signal. A diamond-shaped area under the V sync signal indicates an accumulation time of the CMOS sensor. EVx illustrated under the accumulation time indicates a TVAF evaluation value which is obtained at its timing. A solid line under EVx indicates the focus lens position. In the embodiment, 1V indicates a case of 1/60 second. The drive of the CMOS sensor will be described with reference to FIG. 7. A left portion of FIG. 7 illustrates an image pickup plane and a scanning line. A right portion of FIG. 7 illustrates an accumulation time and a transfer time of charges of each scanning line. Since the CMOS sensor is a sensor of a system called a rolling shutter in which a shutter is released every scanning line, the accumulation time and the transfer time in the upper portion of the picture and those in the lower portion differ as illustrated in the diagram. The diamond shape in FIG. 6 shows the charge accumulation of such a CMOS sensor.

In FIG. 6, at time T3, the camera microcomputer 116 obtains a TVAF evaluation value EV3 corresponding to the charges accumulated in the CMOS sensor for an accumulation time 3. At time T5, the camera microcomputer 116 obtains a TVAF evaluation value EV5 corresponding to the charges accumulated in the CMOS sensor for an accumulation time 5. At time T6, the camera microcomputer 116 compares the TVAF evaluation values EV3 and EV5. If EV5>EV3, a center of vibration of the focus lens 105 is moved. If not, the center of vibration of the focus lens 105 is not moved. In this manner, the camera microcomputer 116 determines the in-focus direction and judges the in-focus state.

Subsequently, timing for processings of the camera microcomputer 116 and the lens microcomputer 115 will be described. FIG. 8 is a diagram illustrating a timing chart of the processings of the camera microcomputer 116 and the lens microcomputer 115 within the period of 1V. In FIG. 8, an axis of abscissa indicates a time. First, just after the V sync signal is output, a communication is made between the camera microcomputer 116 and the lens microcomputer 115. The camera microcomputer 116 obtains the data of the focus lens position and the data of the target position reaching judgement from the lens microcomputer 115. After the TVAF evaluation values are obtained, the camera microcomputer 116 arithmetically operates the target position of the fine drive illustrated in FIG. 6 and the drive speed of the focus lens 105 from the data obtained from the lens microcomputer 115 by the communication and the TVAF evaluation values. After that, the camera microcomputer 116 communicates with the lens microcomputer 115 again and transmits a focus lens drive command (target position, drive speed) and a drive delay time to the lens microcomputer 115. After waiting for the drive delay time, the lens microcomputer 115 executes a lens drive processing and drives the focus lens 105.

Subsequently, such a phenomenon that the camera microcomputer 116 changes the TVAF control by using data of the communication with the lens microcomputer 115 and the camera microcomputer 116 operates correctly with respect to the drive delay of the focus lens 105 will be described. FIG. 9 is a diagram illustrating an example of the communication data of the camera microcomputer 116 and the lens microcomputer 115. The focus target position and the drive speed of the focus lens are included in the data of the communication from the camera microcomputer 116 to the lens microcomputer 115. The data of the focus lens position and the data of the target position reaching judgement are included in the data of the communication from the lens microcomputer 115 to the camera microcomputer 116. For example, a result of the target position reaching judgement may be expressed by an H/L state of a predetermined signal which is generated as one of signals transmitted from the lens microcomputer 115 to the camera microcomputer 116. In this case, the camera microcomputer 116 judges whether the focus lens 105 can reach the drive target position within a predetermined time period, by detecting the H/L state of the predetermined signal. By communicating those data between the camera microcomputer 116 and the lens microcomputer 115, the camera microcomputer 116 decides the drive target position and the drive speed of the focus lens 105 and transmits a drive command of the focus lens 105 to the lens microcomputer 115.

Subsequently, a case where the camera microcomputer 116 judges that the focus lens 105 cannot reach the focus target position received from the camera microcomputer 116 within a predetermined time will be described. In this embodiment, it is assumed that the focus lens 105 is moved in the period of 1V (1/60 second). In this case, the predetermined time corresponds to 1V.

FIG. 10 illustrates a temporal progress of the focus lens operation in the case where the movement of the focus lens 105 is late for the accumulation time 3 serving as first timing. FIG. 10 relates to an example of a case where when the camera microcomputer 116 inherently makes the AF control on the basis of the TVAF evaluation values generated from the charges accumulated in the image pickup element 106 for accumulation times 3, 5, 7, 9, . . . , the focus lens 105 cannot reach the target position in 1V and the drive of the focus lens 105 cannot be completed until the charge accumulation in the accumulation time 3. The lens microcomputer 115 drive-controls the focus drive source 112 so as to move the focus lens 105 to the target position received from the camera microcomputer 116. At the same time, the lens microcomputer 115 transmits data indicating that the focus lens cannot reach the target position within a predetermined time to the camera microcomputer 116 by the communication at time T2. When the data is received, the camera microcomputer 116 sets a TVAF evaluation value EV4 (second focus signal) corresponding to the charges accumulated in the image pickup element 106 for an accumulation time 4 serving as second timing as an evaluation value on the infinity side without using the TVAF evaluation value EV3 (first focus signal) corresponding to the charges accumulated in the image pickup element 106 for the accumulation time 3. At this time, the camera microcomputer 116 controls in such a manner that the focus lens 105 is stopped during the charge accumulation in the area corresponding to a TVAF frame at the accumulation time 4. The camera microcomputer 116 controls the lens microcomputer 115 in such a manner that the subsequent movement of the focus lens is started after completion of the charge accumulation in the area corresponding to the TVAF frame at the accumulation time 4.

After the foregoing operation, in FIG. 10, the TVAF evaluation value which is used in the drive control of the focus lens 105 is delayed and the TVAF control is made on the basis of the TVAF evaluation values which are generated from the charges accumulated in the image pickup element 106 for accumulation times 6, 8, 10, . . . . At time T7, the camera microcomputer 116 compares the TVAF evaluation values EV4 and EV6. If EV6>EV4, the vibration center is moved. If not, the vibration center is not moved. In this manner, the camera microcomputer 116 determines the in-focus direction and judges the in-focus state.

As mentioned above, to the delay of the movement of the focus lens, the lens microcomputer 115 transmits the necessary data to the camera microcomputer 116. The camera microcomputer 116 changes the subsequent drive of the focus lens 105 on the basis of the obtained data. By changing the TVAF evaluation value which is referred to for the TVAF control, the camera microcomputer 116 can correctly obtain the TVAF evaluation value at the timing when the focus lens 105 exists on the infinity side or the nearest side.

Although the present embodiment has been described on the assumption that the camera microcomputer 116 transmits the data of the focus target position to the lens microcomputer 115, it is not limited to the focus target position but may be data indicating a movement amount of the focus lens 105. For example, the camera microcomputer 116 may transmit information indicating in which direction by how many pulses the focus drive source 112 drives the focus lens 105, to the lens microcomputer 115.

Although the embodiment has been described on the assumption that the predetermined time is set to 1V, it is not limited to 1V. The camera microcomputer 116 may set the drive time of the focus lens 105 and transmit to the lens microcomputer 115.

Although the lens microcomputer 115 transmits the data indicating that the focus lens cannot reach the target position to the camera microcomputer 116 at time T2 in FIG. 10, it is also possible to construct in such a manner that the lens microcomputer 115 judges at early timing that the focus lens cannot reach the target position within the predetermined time, and notifies the camera microcomputer 116 of such a fact at timing before time T2.

Although the embodiment has been described on the assumption that, in FIG. 10, after the data indicating that the focus lens cannot reach the target position is received from the lens microcomputer 115, the camera microcomputer 116 effects the TVAF control on the basis of the TVAF evaluation value EV4 generated from the charges accumulated in the image pickup element 106 for the accumulation time 4, the TVAF evaluation value generated from the charges accumulated in the image pickup element 106 for the further subsequent accumulation time may be used. In this case, the camera microcomputer 116 controls the lens microcomputer 115 so as to stop the focus lens 105 during the charge accumulation in the area corresponding to the TVAF frame in the relevant accumulation time.

The present embodiment has been described on the assumption that when it is judged that the focus lens 105 cannot reach the target position within the predetermined time, the lens microcomputer 115 transmits the data indicating that the focus lens cannot reach the target position to the camera microcomputer 116. If the focus lens 105 can reach the target position within the predetermined time, the lens microcomputer 115 transmits the data indicating that the focus lens can reach the target position. By using such a construction as mentioned above, since the camera microcomputer 116 can properly judge whether or not the focus lens 105 can reach the target position within the predetermined time, the more accurate AF control can be realized.

Figure 11:
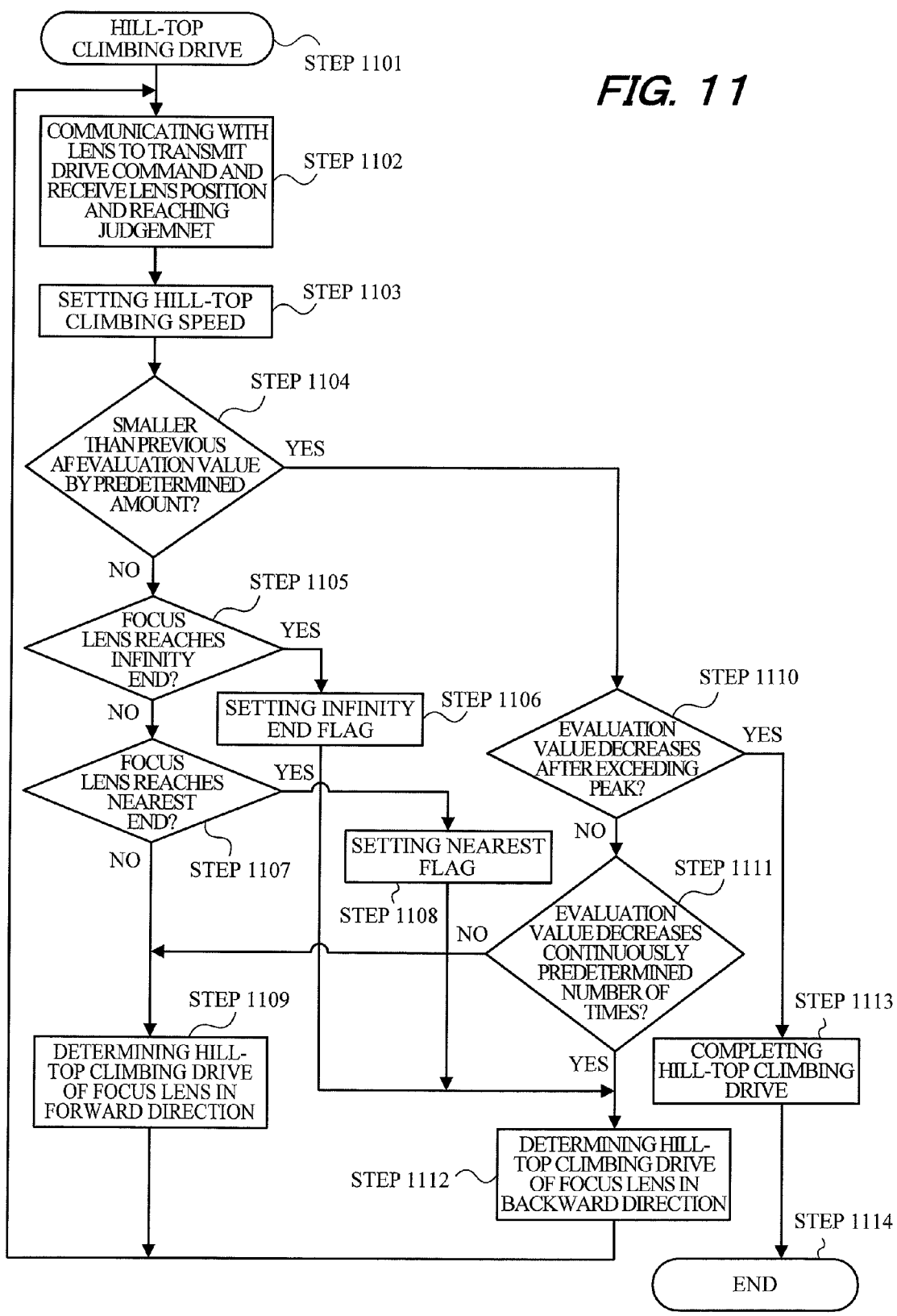
FIG. 11 is a flowchart illustrating control of a hill-top climbing drive in the embodiment of the invention.

Subsequently, control of the hill-top climbing driving operation will be described with reference to FIG. 11. Step 1101 shows a start of a processing routine. In Step 1102, the camera microcomputer 116 transmits a focus lens drive command to the lens microcomputer 115 and receives the data of the focus lens position and the data of the target position reaching judgement to the drive command from the lens microcomputer 115.

In Step 1103, the camera microcomputer 116 sets the drive speed of the focus lens 105 in the hill-top climbing driving operation. Although not mentioned in detail here, generally, the depth of focus is used as a reference, so that when the depth is small, the drive speed is decreased, while when the depth is large, the drive speed is increased.

In Step 1104, the camera microcomputer 116 determines whether or not the TVAF evaluation value is smaller than the previous TVAF evaluation value by a predetermined amount. If it is not smaller, Step 1105 follows. If it is smaller, Step 1110 follows. The predetermined amount is a value which is decided in consideration of an S/N ratio of the TVAF evaluation value and is set as a value which is equal to or larger than a variation amount of the TVAF evaluation value in a state where the object is fixed and the focus lens position is constant. Unless otherwise, it is influenced by the change in TVAF evaluation value that is caused by factors other than a change in focus state and the camera microcomputer 116 cannot make the hill-top climbing drive control in the correct direction.

In Step 1105, the camera microcomputer 116 determines whether or not the focus lens 105 reaches the infinity end. The infinity end is the position closest to the infinity side of a focus lens stroke that has been predetermined on design. If the focus lens 105 reaches the infinity end, Step 1106 follows. If the focus lens 105 does not reach the infinity end, Step 1107 follows.

In Step 1107, the camera microcomputer 116 determines whether or not the focus lens 105 reaches the nearest end. The nearest end is the position closest to the nearest side of the focus lens stroke that has been predetermined on design. If the focus lens 105 reaches the nearest end, Step 1108 follows. If the focus lens 105 does not reach the nearest end, Step 1109 follows.

In each of Steps 1106 and 1108, the camera microcomputer 116 sets a flag for storing an end at which the movement direction of the focus lens is reversed, and advances to Step 1112. The focus lens 105 is reversed in the backward direction and the hill-top climbing drive is continued.

In Step 1109, the camera microcomputer 116 instructs the lens microcomputer 115 so as to hill-top climbing drive the focus lens 105 in the previous forward direction at the speed decided in Step 1103, and advances to Step 1102. The present processing routine is finished.

In Step 1110, if the TVAF evaluation value does not decrease after exceeding a peak, Step 1111 follows. If the TVAF evaluation value decreases after exceeding the peak, Step 1113 follows and the camera microcomputer 116 finishes the hill-top climbing drive. Then, Step 1114 follows and the processing routine is finished and advances to the fine driving operation.

In Step 1111, the camera microcomputer 116 determines whether or not the TVAF evaluation value decreases continuously for a predetermined number of times. If the TVAF evaluation value decreases continuously, Step 1112 follows. If the TVAF evaluation value does not decrease continuously, Step 1109 follows.

In Step 1109, the camera microcomputer 116 instructs the lens microcomputer 115 so as to hill-top climbing drive the focus lens 105 in the previous forward direction at the speed decided in Step 1103, and advances to Step 1102. The present processing routine is finished.

In Step 1112, the camera microcomputer 116 instructs the lens microcomputer 115 so as to hill-top climbing drive the focus lens 105 in the direction opposite to the previous forward direction at the speed decided in Step 1103, and advances to Step 1102. The present processing routine is finished.

Figure 12:
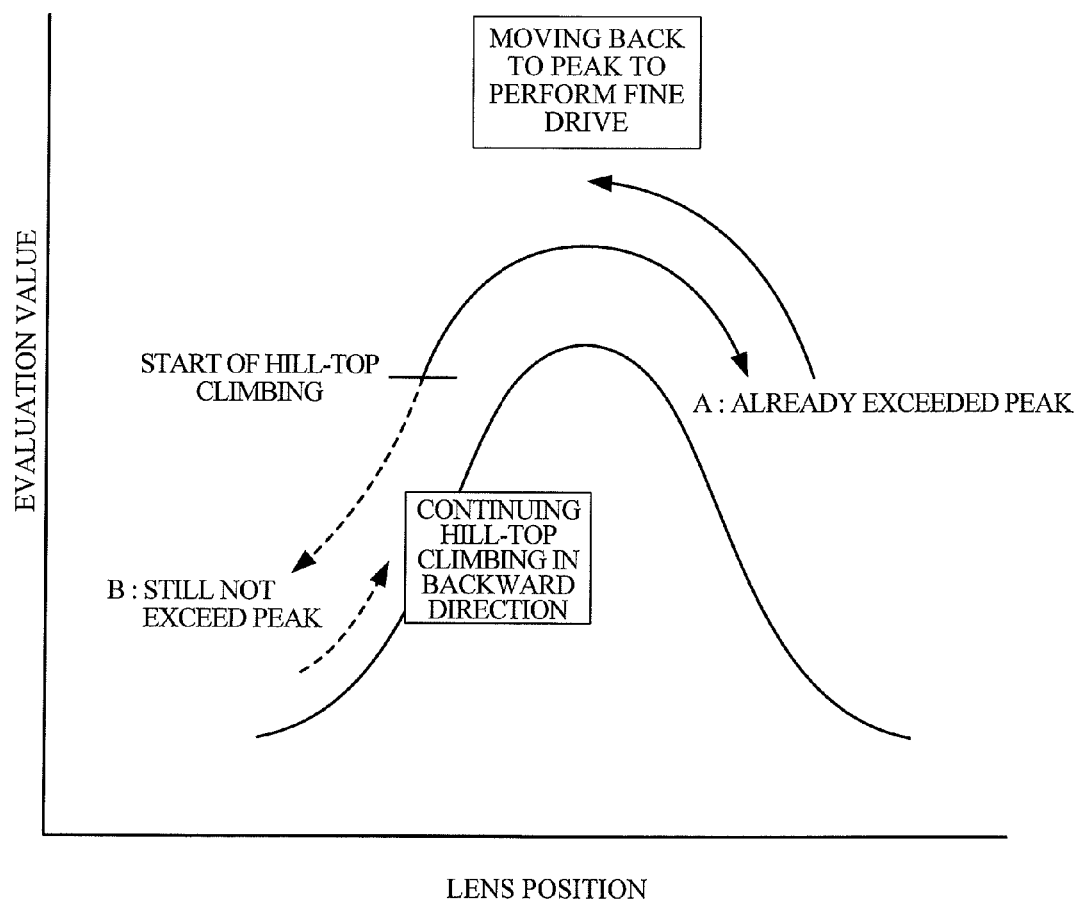
FIG. 12 is a diagram for describing the hill-top climbing drive.

FIG. 12 illustrates the motion of the focus lens 105 at the time of the hill-top climbing driving operation mentioned above. As shown by a solid line A, since the TVAF evaluation value decreases after exceeding the peak, the camera microcomputer 116 determines that there exists an in-focus point during the hill-top climbing drive so far, finishes the hill-top climbing driving operation, and advances to the fine driving operation. On the other hand, as shown by a broken line B, since the TVAF evaluation value decreases without any peak, the camera microcomputer 116 determines that the direction is wrong, reverses the drive direction of the focus lens 105, and continues the hill-top climbing driving operation.

As described above, the camera microcomputer 116 maintains the in-focus state by controlling so as to always maximize the TVAF evaluation value by moving the focus lens while repeating the processing loop of the reactivation judgement→the fine drive→the hill-top climbing drive→the fine drive→the reactivation judgement.

As mentioned above, as to the drive delay of the focus lens 105, the lens microcomputer 115 sends the necessary data to the camera microcomputer 116. The camera microcomputer 116 changes the subsequent drive of the focus lens 105 on the basis of the obtained data. By changing the TVAF evaluation value which is referred to for the TVAF control, the camera microcomputer 116 can correctly refer to the TVAF evaluation value at the timing when the focus lens 105 is stopped to the infinity side or the nearest side. The in-focus direction can be correctly judged.

Second Embodiment

As mentioned above, in the embodiment 1, when the focus lens 105 cannot reach the target position within the predetermined time, the lens microcomputer 115 sends the data indicating that the focus lens cannot reach the target position to the camera microcomputer 116.

In the present embodiment, on the basis of the data of the focus lens position received from the lens microcomputer 115, the camera microcomputer 116 determines that the focus lens 105 cannot reach the target position within the predetermined time. The focus lens drive control in the present embodiment will now be described with reference to FIG. 10.

In FIG. 10, on the basis of the focus lens position received from the lens microcomputer 115 at time T1, the camera microcomputer 116 determines that the focus lens 105 can reach the target position within the predetermined time. If it is determined that the focus lens 105 cannot reach the target position within the predetermined time, in a manner similar to the embodiment 1, the camera microcomputer 116 controls the lens microcomputer 115 so as to stop the focus lens 105 during the charge accumulation in the area corresponding to the TVAF frame at the accumulation time 4 after the focus lens 105 reached the target position. The camera microcomputer 116 makes the TVAF control on the basis of the TVAF evaluation value EV4 generated from the charges accumulated in the image pickup element 106 for the accumulation time 4.

The timing for receiving the focus lens position information for determining whether or not the focus lens 105 can reach the target position within the predetermined time is not limited to time T1. The camera microcomputer 116 may obtain the focus lens position at the predetermined timing in 1V from the lens microcomputer 115.

Also in the present embodiment, the camera microcomputer 116 may effect the TVAF control by using the TVAF evaluation value generated from the charges accumulated in the image pickup element 106 for the accumulation time after the accumulation time 4. In this case, the camera microcomputer 116 instructs the lens microcomputer 115 so as to stop the focus lens 105 during the charge accumulation in the area corresponding to the TVAF frame at the relevant accumulation time.

As described above, if the camera microcomputer 116 can determine that the focus lens 105 cannot reach the target position within the predetermined time on the basis of the data of the focus lens position, the invention can be embodied even if the data indicating that the focus lens cannot reach the target position is not sent from the lens microcomputer 115.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2010-276163, filed Dec. 10, 2010 and No. 2011-234204, filed Oct. 25, 2011, which are hereby incorporated by reference herein in their entirety.

What is claimed is:

1. An image pickup apparatus arranged to detachably mount a lens unit having an optical system including a focus lens, comprising:
an image pickup unit configured to accumulate charges by detecting light which passed through the optical system of the attached lens unit, and generate an image signal from the charges;
a signal generation unit configured to generate a focus signal from the image signal; and
a control unit configured to make a first information corresponding to an amount of movement of the focus lens on the basis of the focus signal, corresponding to the charges accumulated during a period that includes at least a predetermined period during which the focus lens is stopped, generated by the signal generation unit, transmit the first information to the lens unit, and receive information from the lens unit, wherein the control unit receives a predetermined signal from the lens unit, wherein if a signal level of the predetermined signal is a first level, the control unit makes the first information on the basis of a focus signal generated from the image signal corresponding to the charges accumulated during a first period, and if the signal level of the predetermined signal is a second level different from the first level, the control unit determines that the focus lens is not movable by the amount of movement corresponding to the first information within a predetermined time and makes the first information on the basis of a focus signal generated from the image signal corresponding to the charges accumulated during a second period after the first period.

2. An apparatus according to claim 1, wherein the control unit sets the predetermined time and transmits data regarding the predetermined time to the lens unit.

3. An apparatus according to claim 1, wherein the control unit receives data regarding a position of the focus lens from the lens unit and determines whether or not the focus lens is movable by the amount of movement corresponding to the first information within the predetermined time on the basis of the data regarding the position.

4. An apparatus according to claim 1, wherein the focus lens remains stopping during the second period.

5. An apparatus according to claim 1, wherein if the signal level of the predetermined signal is the first level, the control unit determines that the focus lens is movable by the amount of movement corresponding to the first information within the predetermined time.

6. A lens unit which is detachable to an image pickup apparatus having an image pickup unit configured to accumulate charges by detecting light which passed through an optical system, and generate an image signal from the accumulated charges, and a control unit configured to control focus adjustment on the basis of focus signal generated from the image signal corresponding to the charges accumulated during a period that includes at least a predetermined period during which the focus lens is stopped, comprising:

the optical system including a focus lens;

a drive unit configured to drive the focus lens; and a lens control unit configured to receive first information corresponding to an amount of movement of the focus lens from the control unit of the attached image pickup apparatus and control the drive of the drive unit on the basis of the first information, wherein the lens control unit transmits a predetermined signal to the control unit, wherein if a signal level of the predetermined signal is a first level, a focus signal which the control unit uses for making the first information is a focus signal generated from the image signal corresponding to the charges accumulated during a first period, and if the signal level of the predetermined signal is a second level different from the first level, the focus signal which the control unit uses for making the first information is a focus signal generated from the image signal corresponding to the charges accumulated during a second period after the first period, wherein if the focus lens is not movable by the amount of movement corresponding to the first information within a predetermined time, the lens control unit transmits the predetermined signal, the signal level of which is the second level.

7. A lens unit according to claim 6, wherein the lens control unit transmits position information of the focus lens to the control unit.

8. A lens unit according to claim 6, wherein if the focus lens is movable within the predetermined time by the amount of movement corresponding to the first information received from the control unit, the lens control unit transmits the signal showing that the focus lens is movable within the predetermined time to the control unit, and if the focus lens is not movable within the predetermined time by the amount of movement, the lens control unit transmits the signal showing that the focus lens is not movable within the predetermined time to the control unit.

9. A lens unit according to claim 6, wherein the lens control unit controls the drive unit in such a manner that after the focus lens moves by the amount of movement corresponding to the first information received from the control unit, the movement of the focus lens is stopped, and the focus lens remains being stopped until the accumulation of the charges corresponding to a portion in a focus detection area is completed.

10. A lens unit according to claim 6, wherein the focus lens remains stopping during the second period.

11. A lens unit according to claim 6, wherein if the focus lens is movable by the amount of movement corresponding to the first information within the predetermined time, the lens control unit transmits the predetermined signal, the signal level of which is the first level.

12. A control method of an image pickup apparatus arranged to detachably mount a lens unit having an optical system including a focus lens, comprising:

an image pickup step of accumulating charges by detecting with an image pickup unit light which passed through the optical system of the attached lens unit, and generating an image signal from the charges;

a signal generation step of generating a focus signal from the image signal; and a control step of making a first information corresponding to an amount of movement of the focus lens on the basis of the focus signal, corresponding to the charges accumulated during a period that includes at least a predetermined period during which the focus lens is stopped, generated in the signal generation step, transmitting the first information to the lens unit, and receiving information from the lens unit, wherein the control step receives a predetermined signal from the lens unit, wherein if a signal level of the predetermined signal is a first level, the control step makes the first information on the basis of a focus signal generated from the image signal corresponding to the charges accumulated during a first period, and if the signal level of the predetermined signal is a second level different from the first level, the control step determines that the focus lens is not movable by the amount of movement corresponding to the first information within a predetermined time and makes the first information on the basis of a focus signal generated from the image signal corresponding to the charges accumulated during a second period after the first period.

13. A non-transitory computer readable storage medium storing a computer program comprising a program code for causing a computer to execute the control method according to claim 12.

14. A control method of a lens unit which is detachable to an image pickup apparatus having an image pickup unit configured to accumulate charges by detecting light which passed through an optical system including a focus lens, and generate an image signal from the accumulated charges, and a control unit configured to control focus adjustment on the basis of focus signal generated from the image signal corresponding to the charges accumulated during a period that includes at least a predetermined period during which the focus lens is stopped, comprising:
- a drive step of driving the focus lens; and
- a control step of receiving first information corresponding to an amount of movement of the focus lens from the control unit of the attached image pickup apparatus and controlling the drive of the drive step on the basis of the first information,
- wherein the control step includes transmitting a predetermined signal to the control unit,
- wherein if a signal level of the predetermined signal is a first level, a focus signal which the control unit uses for making the first information is a focus signal generated from the image signal corresponding to the charges accumulated during a first period, and if the signal level of the predetermined signal is a second level different from the first level, the focus signal which the control unit uses for making the first information is a focus signal generated from the image signal corresponding to the charges accumulated during a second period after the first timing,
- wherein if the focus lens is not movable by the amount of movement corresponding to the first information within a predetermined time, the control step transmits the predetermined signal, the signal level of which is the second level.

15. A non-transitory computer readable storage medium storing a computer program comprising a program code for causing a computer to execute the control method according to claim 14.

16. A lens unit which is detachable to an image pickup apparatus having an image pickup unit configured to accumulate charges by detecting light which passed through an optical system, and generate an image signal from the accumulated charges and a control unit configured to control focus adjustment on the basis of focus signal generated from the image signal corresponding to the charges accumulated during a period, that includes at least a predetermined period during which the focus lens is stopped, comprising:
- the optical system including a focus lens;
- a drive unit configured to drive the focus lens; and
- a lens control unit configured to receive first information corresponding to an amount of movement of the focus lens from the control unit of the attached image pickup apparatus and control the drive of the drive unit on the basis of the first information,
- wherein the lens control unit transmits a predetermined signal to the control unit, so that the focus signal is generated from the image signal corresponding to the charges accumulated during a first period or a second period different from the first period depending on the signal level of the predetermined signal,
- wherein if the focus lens is movable by the amount of movement corresponding to the first information within a predetermined time, the lens control unit transmits the predetermined signal having a first level, and if the focus lens is not movable by the amount of movement corresponding to the first information within the predetermined time, the lens control unit transmits the predetermined signal, the signal level of which is a second level different from the first level.

* * * * *

UNITED STATES PATENT AND TRADEMARK OFFICE
CERTIFICATE OF CORRECTION

PATENT NO. : 8,643,763 B2
APPLICATION NO. : 13/296844
DATED : February 4, 2014
INVENTOR(S) : Hitoshi Yasuda It is certified that error appears in the above-identified patent and that said Letters Patent is hereby corrected as shown below:

In the Claims
Column 13, lines 32-41, delete:
"6. A lens unit which is detachable to an image pickup apparatus having an image pickup unit configured to accumulate charges by detecting light which passed through an optical system, and generate an image signal from the accumulated charges, and a control unit configured to control focus adjustment on the basis of focus signal generated from the image signal corresponding to the charges accumulated during a period that includes at least a predetermined period during which the focus lens is stopped, comprising:
the optical system including a focus lens;"
and insert:
--6. A lens unit which is detachable to an image pickup apparatus having an image pickup unit configured to accumulate charges by detecting light which passed through an optical system, and generate an image signal from the accumulated charges, and a control unit configured to control focus adjustment on the basis of focus signal generated from the image signal corresponding to the charges accumulated during a period that includes at least a predetermined period during which a focus lens is stopped, comprising:
the optical system including the focus lens;--
Column 16, lines 1-10, delete:
"16. A lens unit which is detachable to an image pickup apparatus having an image pickup unit configured to accumulate charges by detecting light which passed through an optical system, and generate an image signal from the accumulated charges, and a control unit configured to control focus adjustment on the basis of focus signal generated from the image signal corresponding to the charges accumulated during a period, that includes at least a predetermined period during which the focus lens is stopped, comprising:
the optical system including a focus lens;"
and insert:
--16. A lens unit which is detachable to an image pickup apparatus having an image pickup unit configured to accumulate charges by detecting light which passed through an optical system, and generate an image signal from the accumulated charges, and a control unit configured to control focus Signed and Sealed this
Twentieth Day of May, 2014

Michelle K. Lee
*Deputy Director of the United States Patent and Trademark Office* adjustment on the basis of focus signal generated from the image signal corresponding to the charges accumulated during a period, that includes at least a predetermined period during which a focus lens is stopped, comprising:

the optical system including the focus lens;--